Oct. 20, 1931.   J. ROBINSON   1,828,072
INTERCHANGE DEVICE FOR AUTOMATIC CONNECTERS FOR RAILWAY CARS
Filed June 18, 1928
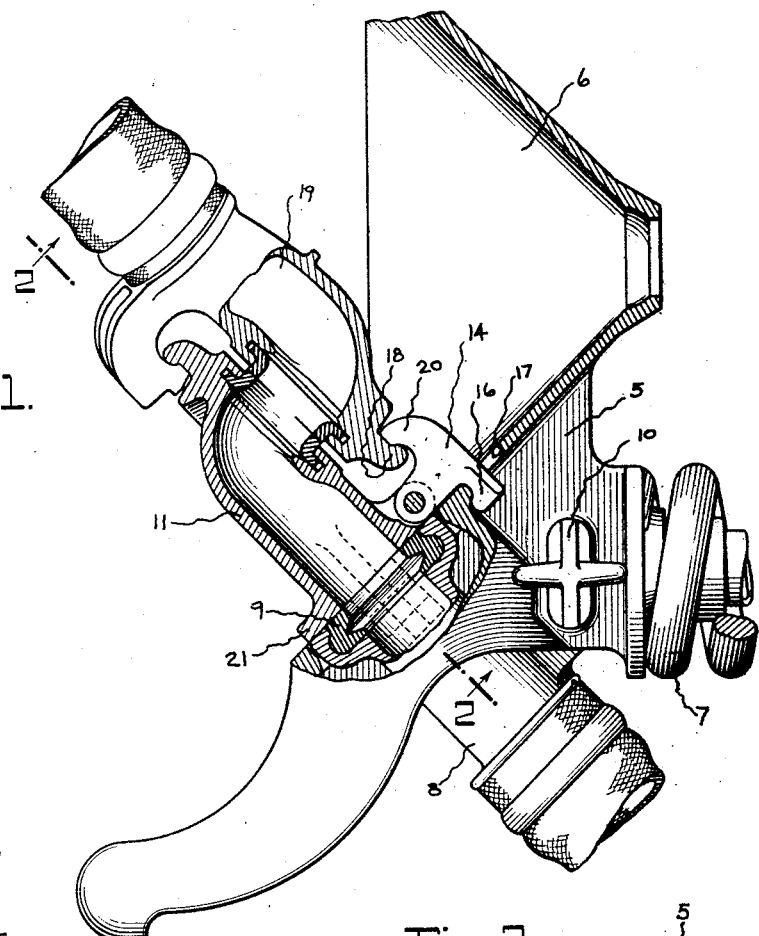
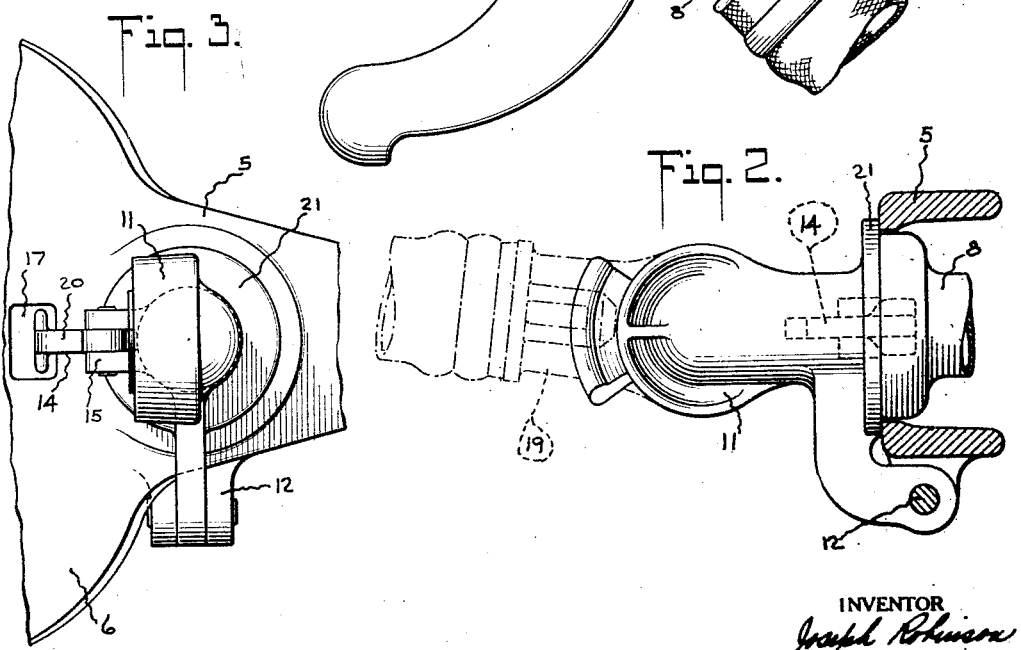
INVENTOR
Joseph Robinson
BY
Watson, Coit, Morse & Grindle
ATTORNEY Patented Oct. 20, 1931

1,828,072

UNITED STATES PATENT OFFICE

JOSEPH ROBINSON, OF NEW YORK, N. Y.

INTERCHANGE DEVICE FOR AUTOMATIC CONNECTERS FOR RAILWAY CARS

Application filed June 18, 1928. Serial No. 286,265.

My invention relates to improvements in interchange devices for automatic connecters for railway cars, and more particularly to that type of interchange which is clamped across the face of the coupling head. Trainmen invariably fail to remove the interchange from this position after using it, with the result that mating connecters often come together with an interchange between their faces causing considerable damage to the connecter heads. My improvements prevent this. In the drawings Figure 1 is a sectional plan view of my improved interchange in the service position, Figure 2 is a sectional side elevation on about the line 2—2 of Figure 1 with some of the parts omitted, and Figure 3 is a front view of my improved interchange swung into position across the face of the coupling head.

Though adapted for use with any type of connecter head I show my improvement applied to a head 5 of the pin and funnel type in which the coupling face is disposed obliquely to the longitudinal direction of the connecter and in the plane of the inner surface of one side of the funnel 6. Any suitable support 7 may be used to suspend the head 5 from the car, and any desired conduit or fitting 8, preferably one carrying an expanding gasket 9, and removably held in the head by a suitable plunger pin 10, may be employed to connect the connector car hose with my improved interchange coupling 11. The interchange is of course shaped to interchangeably receive a standard form of hand hose coupling. It is pivotally fixed to the bottom of the coupling head as at 12, and is adapted to be swung upwardly across the coupling face of the latter into contact with the fitting 8 and the gasket 9. To hold the interchange in this position, I pivotally mount a member or latch 14 on the base of the interchange head 11 as at 15. The member is provided with a dog 16 which hooks into an opening 17 in the funnel 6, and is fimly held in that position by passing the lip 18 of the hose coupling 19 in the hose of the non-connecter car under the curved extension 20 of the member as shown best in Figure 1. As long as the coupling 19 is in the position shown in this figure the interchange 11 remains firmly connected across the connecter face, but immediately the coupling 19 is removed from the position shown in Figure 1, as by parting the cars, the interchange is forced by gravity to automatically drop from the face of the coupling head, after which, and until used again, it hangs in its bearing or carrier 12 below the coupling head and out of the way. It will be noted that the interchange extends at an angle of approximately 45° to the longitudinal direction of the connecter, and that the fluid in the conduit 8 expands the gasket 9 into tight engagement with the base or face 21 of the interchange.

What I claim is:

1. An interchange device for automatic train pipe connecters, comprising in combination, a coupling head, an interchange member adapted to be swung across the coupling face of said head into the service position, means movable relative to said member and cooperating with said head for locking the member in the service position only while the hose of an unequipped car is in interchange connection with said member, said means including a part carried by said hose.

2. An interchange device for automatic train pipe connecters, comprising in combination, a coupling head, a conduit extending therethrough, an interchange member carried by the coupling head and adapted to be swung across the face of the latter into communication with said conduit, means on the member for locking it to the coupling head only while the hose of a car not equipped with the connecter is in interchange communication with said member, and means carried by said hose for actuating said locking means.

3. An interchange device for automatic train pipe connecters, comprising in combination, a coupling head having a conduit therein, an interchange member adapted to be locked across the face of said head into communication with said conduit and to which member the hose of an unequipped car may be connected, said locking means including a device pivoted on said member and having a part adapted to interlock with a part carried by said head and means carried by said hose for holding said device in locked position when said hose is connected to said member.

4. Means for connecting the pipe of a car provided with an automatic train pipe connecter to an adjacent car having a hose provided with the ordinary hand hose coupling, said means comprising, in combination, a connecter head, an interchange member adapted to be moved into service position across the coupling face of said head, and to which said hose may be coupled, and cooperating means on said hose and member and head for locking said member in service position on said head when said hose is connected to said member.

5. A structure as specified in claim 4 in which said member is movable automatically out of service position when said hose is disconnected therefrom.

6. Means for connecting the pipe of a car provided with an automatic train pipe connecter to an adjacent car having a hose provided with the ordinary hand hose coupling, said means comprising, in combination, a connecter head, an interchange member adapted to be moved into service position across the coupling face of said head, and to which said hose may be coupled, a latch carried by said member for engaging said head, and means carried by said hose for moving said latch into engagement with said head when said hose is connected to said member.

7. Means for connecting the pipe of a car provided with an automatic train pipe connecter to an adjacent car having a hose provided with the ordinary hand hose coupling, said means comprising, in combination, a connecter head, an interchange member adapted to be moved into service position across the coupling face of said head, and to which said hose may be coupled, a latch carried by said member for engaging said head, and means carried by said hose for moving said latch into engagement with said head when said hose is connected to said member, said member being movable automatically out of service position when said hose is disconnected therefrom.

8. Means for connecting the pipe of a car provided with an automatic train pipe connecter to an adjacent car having a hose provided with the ordinary hand hose coupling, said means comprising, in combination, a connecter head having a coupling face, an interchange member carried by said head and movable into position across said face and to which member said hose may be connected, cooperating locking means carried by said head and said member for locking the latter in position across the front face of the head, and means carried by said hose for causing engagement of said locking means with said head when said hose is connected to said member.

9. A construction as defined in claim 8 in which said locking means are automatically disengaged when the hose is disconnected from said member.

10. Means for connecting the fluid carrying pipe of a car provided with an automatic train pipe connecter to an adjacent car having a hose provided with the ordinary hand hose coupling, said means comprising, in combination, a connecter head carried by said car, an interchange member adapted to be placed in service position across the coupling face of said head and to which said hose may be coupled, means for locking said member in service position on said head when said hose is connected to said member, said last named means including a part carried by said hose and a part carried by said head.

11. Means for connecting the fluid carrying pipe of a car provided with an automatic train pipe connecter to an adjacent car having a hose provided with the ordinary hand hose coupling, said means comprising, in combination, a connecter head carried by said car and having a fluid carrying passageway therein, a tubular member carried by said head and movable into operative position with one end thereof in line with said passageway, the other end thereof having means to which said hose may be coupled, and cooperating means carried by said hose and said member and said head for locking said member in said operative position when said hose is coupled to said member.

12. A construction as specified in claim 11, in which said tubular member is pivotally connected to said head and automatically movable out of said operative position when said hose is uncoupled from said member.

13. Means for connecting the fluid carrying pipe of a car provided with an automatic train pipe connecter to an adjacent car having a hose provided with the ordinary hand hose coupling, said means comprising, in combination, a connecter head carried by said car and having a fluid carrying passageway therein, a tubular member pivotally supported on said head and movable into operative position with one end thereof in line with said passageway, the other end thereof having means to which said hose may be coupled, a movable latch carried by said member and arranged to engage a part on said head, and a part carried by said hose for engaging said latch and moving it into engagement with said head when said hose is coupled to said member, said member being free to move automatically into inoperative position when said hose is uncoupled from said member.

In testimony whereof I hereunto affix my signature.

JOSEPH ROBINSON.